(12) United States Patent
Regterschot et al.

(10) Patent No.: US 12,734,776 B2
(45) Date of Patent: Sep. 15, 2026

(54) TIRE BUILDING DRUM AND METHOD FOR TURNING-UP A TIRE COMPONENT

(71) Applicant: VMI HOLLAND B.V., Epe (NL)

(72) Inventors: Tom Regterschot, Epe (NL); Martin De Graaf, Epe (NL)

(73) Assignee: VMI HOLLAND B.V., Epe (NL)

( * ) Notice: Subject to any disclaimer, the term of this patent is extended or adjusted under 35 U.S.C. 154(b) by 0 days.

(21) Appl. No.: 19/109,309

(22) PCT Filed: Aug. 23, 2023

(86) PCT No.: PCT/NL2023/050433
§ 371 (c)(1),
(2) Date: Mar. 6, 2025

(87) PCT Pub. No.: WO2024/063640
PCT Pub. Date: Mar. 28, 2024

(65) Prior Publication Data

US 2026/0001292 A1 Jan. 1, 2026

(30) Foreign Application Priority Data

Sep. 21, 2022 (NL) ..................................... 2033093

(51) Int. Cl.
*B29D 30/32* (2006.01)
*B29D 30/26* (2006.01)

(52) U.S. Cl.
CPC ...... *B29D 30/32* (2013.01); *B29D 2030/2614* (2013.01); *B29D 2030/3221* (2013.01); *B29D 2030/3242* (2013.01)

(58) Field of Classification Search
CPC ............ B29D 30/32; B29D 2030/2614; B29D 2030/3221; B29D 2030/3228;
(Continued)

(56) References Cited

U.S. PATENT DOCUMENTS 9,044,910 B2 6/2015 Marangoni et al.
2011/0088832 A1 4/2011 Marchini et al.
(Continued)

FOREIGN PATENT DOCUMENTS

FR 1485919 A * 6/1967 ............. B29D 30/32
GB 1589440 A 5/1981
(Continued)

OTHER PUBLICATIONS

Continental, FR-1485919-A, machine translation. (Year: 1967).*
(Continued)

*Primary Examiner* — Sedef E Paquette
(74) *Attorney, Agent, or Firm* — Workman Nydegger

(57) ABSTRACT

A tire building drum and a method are provided for turning-up a tire component. The tire building drum comprises a drum body that is rotatable about a drum axis, an inflatable turn-up bladder extending in a circumferential direction about the drum axis around the drum body for turning-up a tire component supported on the turn-up bladder, and a plurality of pressing arms for pressing against the turn-up bladder during the turning-up of the tire component. The tire building drum further comprises a plurality of hinges for hingably connecting the pressing arms to the drum body. The plurality of hinges is located underneath the turn-up bladder when the turn-up bladder is uninflated. The tire building drum is further provided with an underlay extending between at least one hinge of the plurality of hinges and the turn-up bladder in a radial direction.

22 Claims, 6 Drawing Sheets

(58) Field of Classification Search
CPC ...... B29D 2030/3242; B29D 2030/325; B29D 2030/3264
USPC .................................................. 156/400, 401
See application file for complete search history.

(56) References Cited

U.S. PATENT DOCUMENTS

| | | | | |
|---|---|---|---|---|
| 2021/0114323 | A1 | 4/2021 | Zweers | |
| 2021/0379852 | A1* | 12/2021 | Doppenberg | .......... B29D 30/32 |

FOREIGN PATENT DOCUMENTS

| | | | | |
|---|---|---|---|---|
| JP | 2010523369 | A | 7/2010 | |
| JP | 2016120701 | A | 7/2016 | |
| KR | 20030057166 | A | 7/2003 | |
| KR | 100441959 | B1 | 7/2004 | |
| KR | 20200140374 | A | 12/2020 | |
| WO | 2009128103 | A1 | 10/2009 | |
| WO | WO-2017018875 | A1 * | 2/2017 | ............. B29D 30/32 |
| WO | 2019199160 | A1 | 10/2019 | |

OTHER PUBLICATIONS

International Search Report from corresponding PCT Application No. PCT/NL2023/050433, Nov. 10, 2023.
Dutch Search Report from corresponding NL Application No. 2033093, May 10, 2023.
Korean Office Action from Corresponding Korean Patent Application No. KR1020257012954, Sep. 8, 2025.
Japanese Office Action from corresponding JP Application No. 2024-517456, Mar. 11, 2025.
Decision to Grant a Patent from Corresponding Japanese Patent Application No. JP2024517456, Jun. 17, 2025.
Korean Decision to Grant from Corresponding Korean Patent Application No. KR1020257012954, Apr. 27, 2026.

* cited by examiner 1
30
3
D
52
23
2
20
40
5
4
50
7
51
22
B
T
11
21
10
R
A
9
C
S 401
30
3
D
52
23
2
20
40
405
4
50
51
412
407
22
B
T
11
21
410
R
A
9
C
S

TIRE BUILDING DRUM AND METHOD FOR TURNING-UP A TIRE COMPONENT

BACKGROUND

The invention relates to a tire building drum and a method for turning-up a tire component.

WO 2019/199160 A1 discloses a tire building drum that comprises a first drum half, a second drum half and a center section that is located in the axial direction between the first drum half and the second drum half. The tire building drum is further provided with turn-up bladders extending around the first drum half and the second drum half for turning-up tire components supported on said turn-up bladders. The tire building drum further comprises a plurality of pressing arms located between the uninflated turn-up bladders and the respective drum halves for pressing against the turn-up bladders during the turning-up of the tire components. The pressing arms are hinged on the respective drum halves at a position located underneath the turn-up bladders when uninflated.

SUMMARY OF THE INVENTION

A disadvantage of the known tire building drum is that the turn-up bladders are supported directly on the pressing arms and their respective hinges. During turning-up of the pressing arms, during the subsequent return of the pressing arms to their rest positions and/or during expansion or contraction of the tire building drum, the turn-up bladders may get caught, stuck or pinched between the pressing arms and/or their respective hinges. In particular, the inclination of the pressing arms during the turn-up operation forces the turn-up bladders towards and/or into any gaps at the respective hinges. Repeated pinching may seriously damage the turn-up bladders up to a point that the bladder is no longer uniform or air-tight, and has to be replaced.

It is an object of the present invention to provide a tire building drum and a method for turning-up a tire component, wherein the lifetime of turn-up bladders can be improved.

According to a first aspect, the invention provides a tire building drum comprising a drum body that is rotatable about a drum axis, an inflatable turn-up bladder extending in a circumferential direction about the drum axis around the drum body for turning-up a tire component supported on said turn-up bladder, and a plurality of pressing arms distributed in the circumferential direction around the drum body and located between the drum body and the turn-up bladder for pressing against the turn-up bladder during the turning-up of the tire component, wherein the tire building drum comprises a plurality of hinges for hingably connecting the pressing arms to the drum body, wherein the plurality of hinges is located underneath the turn-up bladder when the turn-up bladder is uninflated, wherein the tire building drum is provided with an underlay extending between at least one hinge of the plurality of hinges and the turn-up bladder in a radial direction perpendicular to the drum axis.

In the context of the present invention, the term 'underlay' is to be interpreted as a layer of material that is placed under something else for protection or support. The underlay can support the turn-up bladder with respect to the drum body at the position of the at least one hinge, thereby reducing the risk that the turn-up bladder gets pinched at said at least one hinge. In particular, the underlay may have one or more of the following characteristics: it may slide more easily over the pressing arms than the turn-up bladder, it may have a relatively high compression resistance or be relatively stiff along the pressing arms, it may have a higher minimum bend radius, and/or it may be relatively thick. As such, the underlay itself is less likely to get stuck in or pinched by said at least one hinge. Specifically, when a force exerted on the underlay in a direction along the pressing arms exceeds the friction between the underlay and the pressing arms, the underlay may simply slide over the pressing arms, thereby also reducing any tension in the turn-up bladder that would otherwise force the turn-up bladder towards and/or into the at least one hinge. Furthermore, the minimum bend radius and/or the thickness of the underlay can shield the turn-up bladder from any sharp edge or acute angles at the at least one hinge and provide a relatively smooth support surface for said turn-up bladder. Hence, the turn-up bladder is less likely to be damaged by said at least one hinge during the turning-up. Consequently, the lifetime of said turn-up bladder can be increased without modifying the turn-up bladder itself. Advantageously, the turn-up bladder can be designed with optimal characteristics for turning-up, without requiring reinforcements at the position of the at least one hinge.

In one embodiment the underlay has a first end that is fixed to the drum body at a side of the plurality of hinges facing away from the plurality of pressing arms. Alternatively, the drum body comprises a bead-lock section, wherein the underlay has a first end that is fixed to the drum body at a side of the plurality of hinges facing the bead-lock section. By fixing the underlay at said first end to the drum body, the underlay can be kept in position at or near the at least one hinge. In other words, it can be prevented that the underlay shifts out of position, which could potentially expose the at least one hinge and damage the turn-up bladder.

In each of the aforementioned embodiments, the underlay may have a second end opposite to the first end, wherein the second end rests on at least one pressing arm of the plurality of pressing arms. With the second end resting on the at least one pressing arm, the underlay can effectively extend across said at least one hinge from the first end that is fixated on the drum body up to a position on the at least one pressing arm.

Preferably, the second end is free, unfixed or unrestrained to slide over said at least one pressing arm in an arm direction parallel to said at least one pressing arm. The position of the second end on the at least one pressing arm can thus passively follow or adapt itself in response to a change in the orientation of the at least one pressing arm, thereby allowing the at least one pressing arm to turn-up and press against the turn-up bladder.

Additionally or alternatively, the underlay is at least partially transformable from a cylindrical configuration into a conical configuration. The conical part of the underlay can therefore passively follow or adapt itself to a joined turn-up of the plurality pressing arm.

In one particular embodiment the underlay comprises an underlay body that is annular at a first end and split into a plurality of arm sections at a second end opposite to the first end. The underlay body can therefore cover the plurality of hinges in a continuous or substantially continuous manner at the first end while passively following or adapting to a change in orientation, and the resulting diameter expansion, of the plurality of pressing arms at the second end.

Preferably, each arm section of the plurality of arm sections is configured to extend along and rest on a respective pressing arm of the plurality of pressing arms. Hence, each arm section can passively follow or adapt to a change in orientation of the respective pressing arm while remaining on the respective pressing arm.

In a further embodiment thereof the underlay body, at the plurality of arm sections, is transformable from a cylindrical configuration into a conical configuration. As mentioned before, the conical part of the underlay can therefore passively follow or adapt itself to a joined turn-up of the plurality pressing arm.

Preferably, the underlay body is provided with a plurality of slits splitting the underlay body into the plurality of arm sections. Because of the slits, the arm sections can be variably spaced apart in the circumferential direction at the second end in response to a change in orientation of the pressing arms. In particular, the arm sections can be spread apart to follow the spreading apart of the pressing arms as they move or expand towards a greater diameter.

More preferably, the plurality of slits, in the cylindrical configuration of the underlay body, extends mutually parallel. Consequently, the arm sections defined by said splits can extend mutually parallel in said cylindrical configuration as well.

Most preferably, the plurality of slits extends over at least half of a length of the underlay body between the first end and the second end. Hence, at least half of the length of the underlay body can be expanded from the cylindrical configuration into the conical configuration, while half of the underlay body or less can remain in the cylindrical configuration to effectively shield the turn-up bladder from the plurality of hinges.

In a further embodiment the underlay body comprises a plurality of bridge portions, wherein each bridge portion of the plurality of bridge portion interconnects a pair of arm sections of the plurality of arm sections at the first end, wherein each bridge portion has an elasticity in the circumferential direction that is greater than an elasticity in the circumferential direction of the respective pair of arm sections it interconnects. Hence, the diameter of the underlay body can be expanded, at least at the first end, to allow for mounting of the underlay body to the drum body at said first end. Moreover, the underlay can be removed from the drum body without damaging the underlay body.

Preferably, the underlay body, at the plurality of arm sections, has a first thickness and, at the plurality of bridge portions, has a second thickness smaller than the first thickness. The reduced thickness or thinning of the bridge portions can increase the elasticity of the underlay body at the respective bridge portions.

Additionally or alternatively, the underlay body comprises a different material at the plurality of bridge portions compared to the plurality of arm sections. The material of the bridge can be selected to have a higher elasticity in the circumferential direction than the material of the plurality of arm sections.

In a further embodiment thereof the underlay body comprises a different configuration of layers at the plurality of bridge portions compared to the plurality of arm sections. In particular, the underlay body may comprises a laminate of a first layer with a first elasticity and a second layer with a second elasticity greater than the first elasticity, wherein the second layer is covered by the first layer at the plurality of arm sections and exposed at the plurality of bridge portions. Hence, the second layer is allowed to elastically expand in the circumferential direction at the bridge portions whereas its elasticity is restricted by the first layer in the arm sections.

In yet another alternative embodiment the underlay body is spliced into an annular configuration at the first end. By splicing the underlay body, the underlay body itself does not necessarily have to be elastic in the circumferential direction. Instead, it may be inelastic in said circumferential direction.

In yet another alternative embodiment the underlay comprises a plurality of arm sections extending separately from the first end towards a second end opposite to the first end. By forming the underlay with separate arm sections, there is no need for elasticity or bridge portions between the arm sections. Instead, each arm section can be mounted separately in a position on a respective pressing arm.

Preferably, each arm section of the plurality of arm sections is configured to extend along and rest on a respective pressing arm of the plurality of pressing arms. Hence, each separately mounted arm section can passively follow or adapt to a change in orientation of the respective pressing arm while remaining on the respective pressing arm.

In another embodiment the underlay has a first end that is fixed to the drum body by one or more fasteners. Hence, it can be prevented that the underlay gets detached from the drum body at its first end.

Preferably, the one or more fasteners comprises a fastener of the group comprising: a pin, a bolt, a clamp or a ridge. Such fasteners may mechanically engage with the drum body, for example through threading, or interact with the drum body in a form-fitting manner.

According to a second aspect, the invention provides a method for turning-up a tire component using the tire building drum according to any one of the embodiments of the first aspect of the invention, wherein the method comprises the steps of:

providing the underlay between the at least one hinge and the turn-up bladder in the radial direction; and supporting the turn-up bladder on the underlay at the at least one hinge during the turning-up of the tire component.

The method according to the second aspect of the invention relates to the practical implementation of the tire building drum according to the first aspect of the invention and thus has the same technical advantages, which will not be repeated hereafter.

According to an unclaimed third aspect, the invention provides an underlay for use in a tire building drum according to any one of the embodiments of the first aspect of the invention. The underlay according to the second aspect of the invention, when implemented in the tire building drum according to the first aspect of the invention, has the same technical advantages, which will not be repeated hereafter.

According to an unclaimed fourth aspect, the invention provides a use of an underlay according to the second aspect of the invention in a tire building drum according to any one of the embodiments of the first aspect of the invention. The use according to the third aspect of the invention relates to the practical implementation of the underlay in the tire building drum according to the first aspect of the invention and thus has the same technical advantages, which will not be repeated hereafter.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
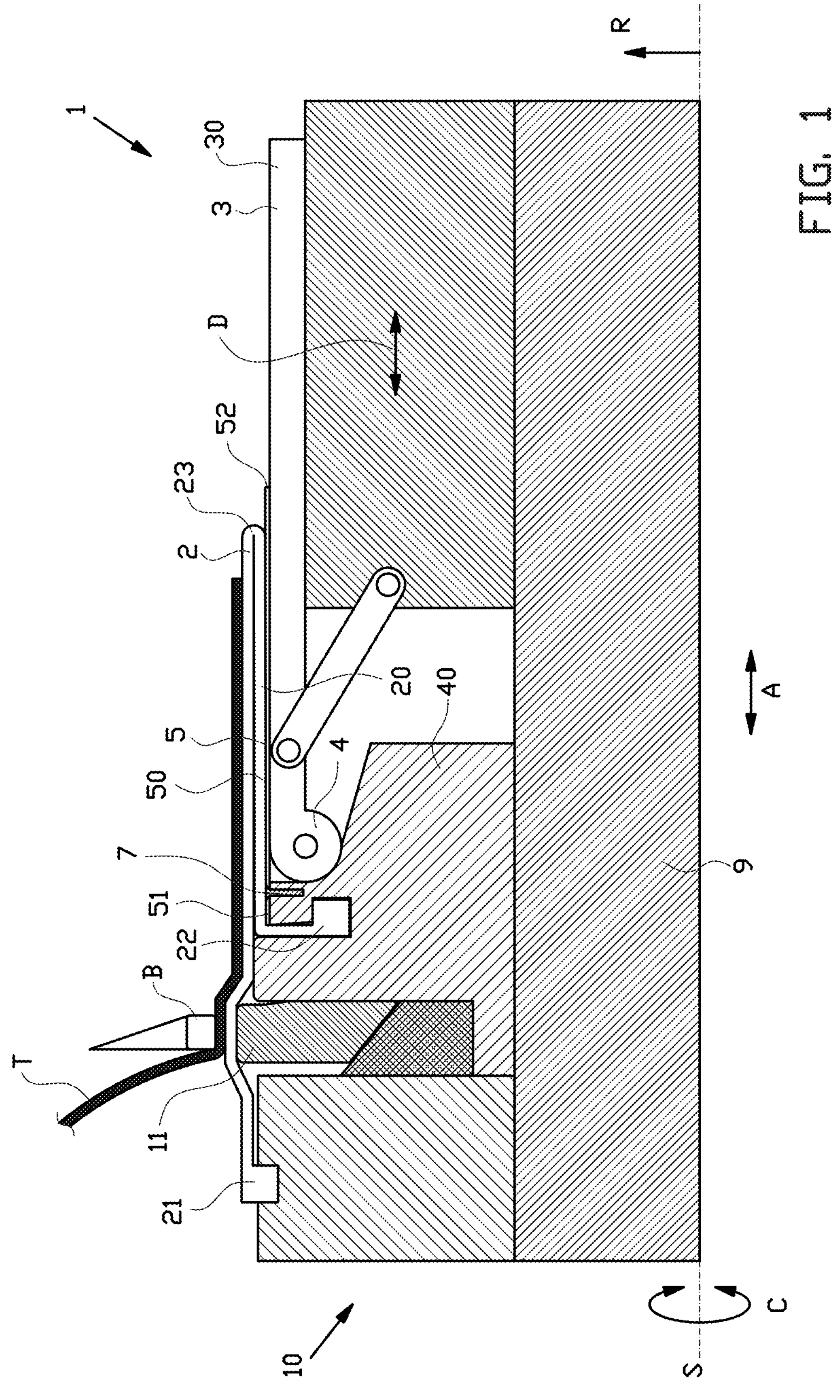
FIG. 1 shows a cross section of a tire building drum having a drum body, a turn-up bladder, pressing arms and an underlay according to a first embodiment of the invention, prior to turning-up of a tire component.
Figure 2:
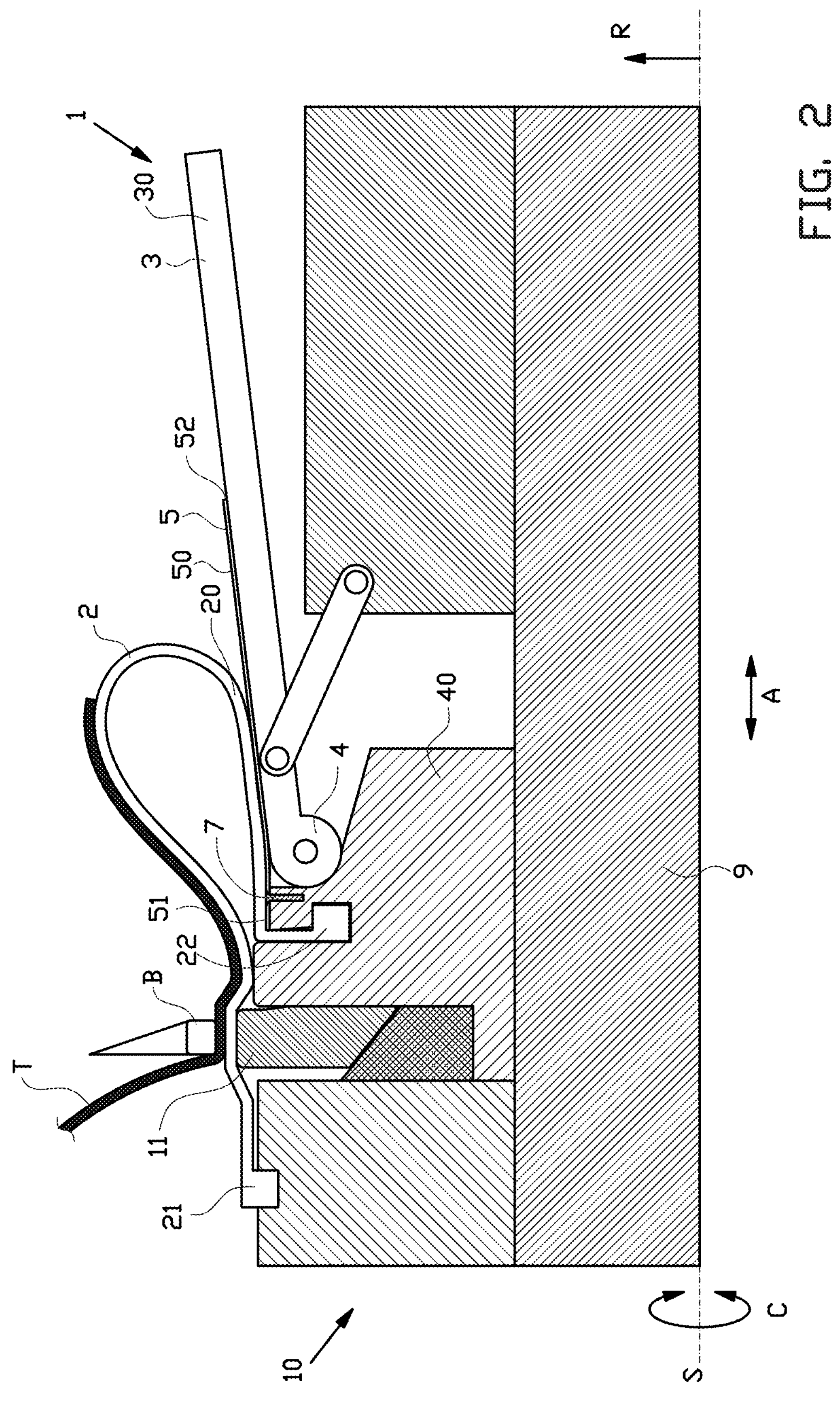
FIG. 2 shows a cross section of the tire building drum according to FIG. 1 during turning-up of the tire component.

FIGS. 1 and 2 show a tire building drum 1 according to a first embodiment of the invention for building a green or unvulcanized tire (not shown).

The tire building drum 1 is arranged, adapted or configured for shaping a carcass of a tire by turning-up a tire component T, in particular a pre-assembly, around a bead B. The pre-assembly typically includes an inner-liner, one or more body plies and a side wall.

As shown in FIG. 1, the tire building drum 1 comprises a drum body 10 that is rotatable about a drum axis S. In this example, the drum body 10 is mounted on a drum shaft 9. The drum body 10 has an axial direction A parallel to said drum axis S and a radial direction R perpendicular to the drum axis S and/or said axial direction A. In this example, the drum body 10 comprises only drum half of the tire building drum 1. The tire building drum 1 comprises two of such drum halves arranged on opposite sides a center section (not shown) in a manner known per se. Note that FIG. 1 only shows the part of the drum body 10 above the drum axis S. Each drum half is provided with a bead-lock section 11 to clamp the bead B to the drum body 10 on respective sides of the center section.

As best seen in FIG. 2, the tire building drum 1 is provided with an inflatable turn-up bladder 2. The turn-up bladder 2 extends in a circumferential direction C about the drum axis S around the drum body 10. The turn-up bladder 2 has an air-tight bladder body 20 with a first circumferential edge 21 and a second circumferential edge 22 which are clamped and sealed to the drum body 10 on opposite sides of the bead-lock section 11. In FIG. 1, the bladder body 20 is folded back onto itself around a fold 23. The tire building drum 1 is connectable to a source of compressed air which is arranged in air communication with the turn-up bladder 2 to inflate the bladder body 20 between the circumferential edges 21, 22 from an uninflated state, as shown in FIG. 1, to an inflated state, as shown in FIG. 2, for turning-up a tire component T supported on said turn-up bladder 2. The turn-up bladder 2 is elastic in the circumferential direction C.

As shown in FIGS. 1 and 2, the tire building drum 1 further comprises a plurality of pressing levers or pressing arms 3 distributed in the circumferential direction C around the drum body 10. The pressing arms 3 are located in the radial direction R between the drum body 10 and the turn-up bladder 2, at least when the pressing arms 3 are in the arms-down position and when the turn-up bladder 2 is uninflated, as shown in FIG. 1. In particular, the bladder body 20, in the uninflated state of the turn-up bladder 2, rests on the pressing arms 3. Each pressing arm 3 has an elongated arm body 30 extending in an arm direction D. The pressing arms 3 are rotatable, tiltable or pivotable from a level or arms-down position, as shown in FIG. 1, into an inclined or arms-up position, for pressing against the turn-up bladder 2 during the turning-up of the tire component T. In this manner, the turn-up bladder 2 can be urged towards and into tight contact with the tire component T during the turning-up. In the arms-down position of FIG. 1, the pressing arms 3 extend parallel or substantially parallel to the axial direction A. In particular, in the arms-down position the pressing arms 3 define a substantially cylindrical surface of the tire building drum 3 for supporting the turn-up bladder 2.

The tire building drum 1 comprises a plurality of hinges 4 for hingably connecting the pressing arms 3 to the drum body 10. The hinges 4 are distributed about the drum axis S around the drum body 10. In this example, the hinges 4 are supported an annular arm support. The hinges 4 are located at a side of the pressing arms 3 facing the bead-lock section 11, i.e. the side of the pressing arms 3 closest to the bead-lock section 11. In other words, the pressing arms 3, in the arms-down position, extend from the hinges 4 in a direction away from the bead-lock section 11. Hence, the pivoting of the pressing arms 3 towards the arms-up position of FIG. 2 includes at least a vector component in a direction parallel to the axial direction A towards the bead-lock section 11.

Note that, in this example, the second circumferential edge 22 of the bladder body 20 is clamped to the drum body 10 at a position between the bead-lock section 11 and the hinges 4. When the turn-up bladder 2 is uninflated, the fold 23 rests on the pressing arms 3 in a position outside of the area defined between the first circumferential edge 21 and the second circumferential edge 22. In other words, at least a part of the uninflated turn-up bladder 2 between the fold 23 and the second circumferential edge 22 covers the pressing arms 3. Moreover, the plurality of hinges 4 is located underneath or covered by the turn-up bladder 2 when said turn-up bladder 2 is uninflated.

As shown in FIGS. 1 and 2, the tire building drum 1 is provided with a support layer or an underlay 5 extending at, across or over the hinges 4. The underlay 5 is adapted, arranged or configured for supporting the turn-up bladder 2 with respect to the drum body 10 at the position of the hinges 4. In particular, the underlay 5 is positioned such that it extends or is located between the hinges 4 and the turn-up bladder 2, considered in the radial direction R, at least when the pressing arms 3 are in the arms-down position and when the turn-up bladder 2 is uninflated, as shown in FIG. 1. As such, the underlay 5 can prevent direct contact between the turn-up bladder 2 and the hinges 4.

In this exemplary embodiment, the underlay 5 has an underlay body 50. The underlay body 50 comprises a layer of material that can effectively shield the hinges 4 from the turn-up bladder 2. In this example, the layer of material is inelastic or substantially inelastic, at least within the normal range of forces that are exerted onto the underlay body 50 during turning-up. Alternatively, the layer of material may be elastic in one direction only, for example the circumferential direction C.

In this example, the underlay body 50 is made from a durable material comparable to materials used in conveyor belts. The durable material may for example be a fabric. Alternatively, a metal may be used, for example a spring steel.

The underlay body 50 preferably has one or more of the following characteristics:

- the underlay body 50 has a friction coefficient on the pressing arms 3 that is lower, preferably eighty percent or less and most preferably fifty percent or less, than the friction coefficient of the turn-up bladder 2 on the pressing arms 3 if it was supported directly on the pressing arms 3;
- the underlay body 50 has a compression resistance along the pressing arms 3 that is higher, preferably at least one-hundred-and-twenty percent and most preferably at least one-hundred-and-fifty percent, than the compression resistance of the turn-up bladder 2 along the pressing arms 3;
- the underlay body 50 has a minimum bend radius before kinking that is greater, preferably at least one-hundred-and-twenty percent and most preferably at least one-hundred-and-fifty percent, than the minimum bend radius of the turn-up bladder 2; and
- the underlay body 50 has a thickness of at least one millimeter, and preferably at least two millimeters.

Figure 3:
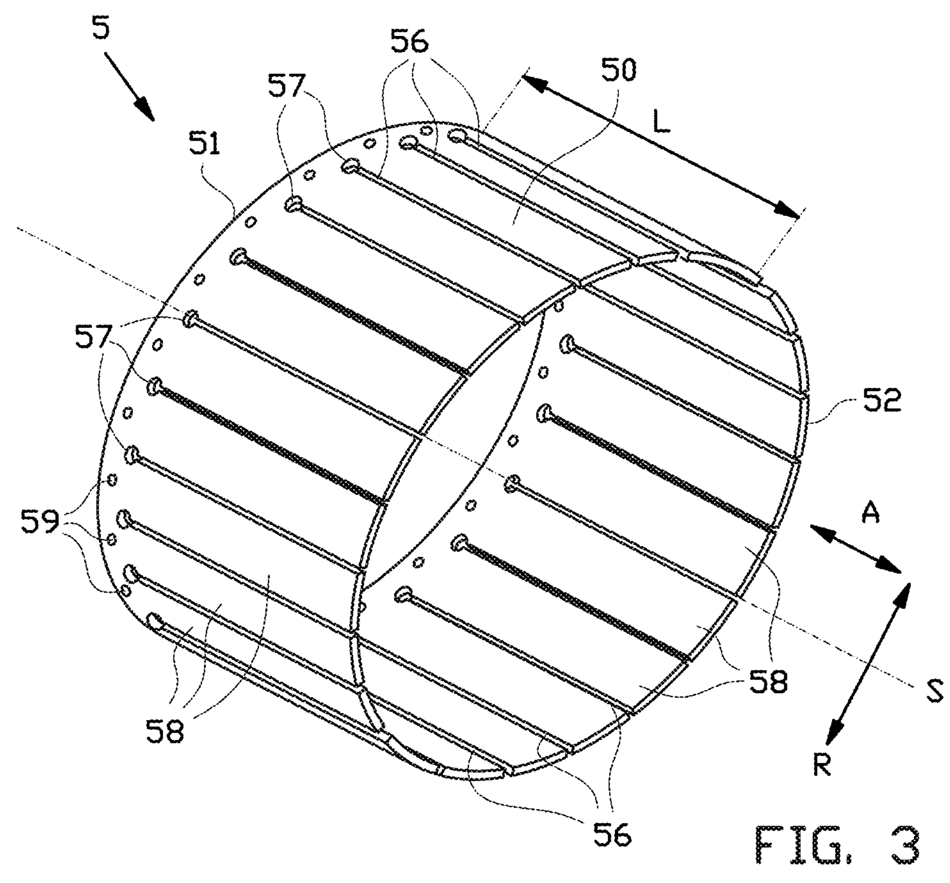
FIG. 3 shows an isometric view of the underlay of the tire building drum according to FIG. 1.

As shown in FIG. 3, the underlay body 50 is continuous, ring-shaped and/or annular at the first end 51. The underlay body 50, at the first end 51, is fixed to the drum body 10. In this example, the first end 51 is mounted or fixed to the drum body 10 at a side of the hinges 4 facing away from the pressing arms 3. More specifically, the first end 51 is mounted or fixed to the drum body 10 in a position between the hinges 4 and the second circumferential edge 22 of the bladder body 20. The underlay 5 is fixed to the drum body 10 with the use of suitable fasteners 7, e.g. pins, bolts or clamps.

Figure 4:
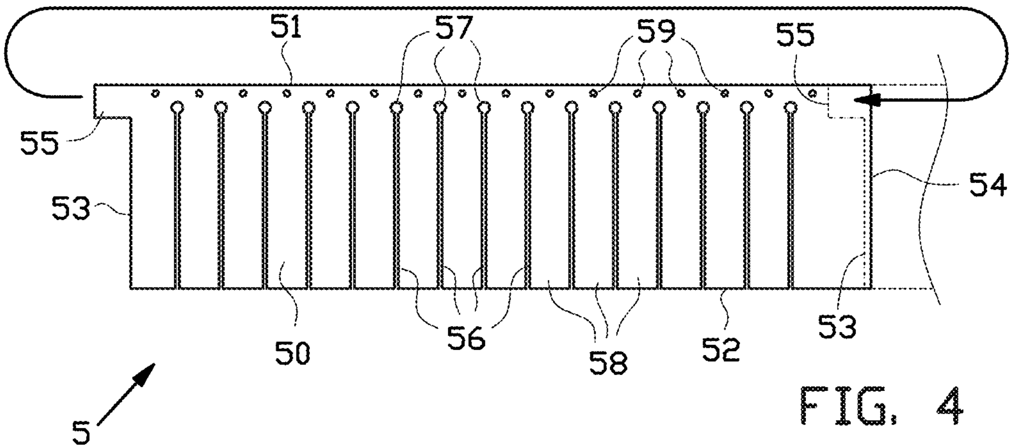
FIG. 4 shows a top view of an underlay body prior to splicing it into an annular configuration.

To allow for fitting or mounting of the annular first end 51 of the underlay body 50 around the drum body 10, the underlay body 50 may initially be provided as a band of material, as shown in FIG. 4, having a first splice edge 53, a second splice edge 54 and optionally a splice lip 55, which can be joined or spliced into an annular configuration around the drum body 10 by joining or splicing the first splice edge 53 to the second splice edge 54, or vice versa, with or without the use of the splice lip 55. The underlay 5 may be removed from the drum body 10 by detaching the splice edges 53, 54, i.e. by cutting the underlay body 50 along the joint or the splice.

At a second end 52, opposite to the first end 51, the underlay body 50 is supported by or rests on the plurality of pressing arms 3. The second end 52 is unfixed, free and/or unrestrained and therefore free to passively move or slide over the pressing arms 3 along the respective arm bodies 30 thereof. In other words, the second end 52 is slidable over the arm bodies 30 in the arm direction D.

The underlay body 50 is at least partially expandable, transformable or deformable from a cylindrical configuration, as shown in FIG. 1, into a conical configuration, as shown in FIG. 2. In particular, at, near or towards the second end 52, the underlay 5 is provided with a plurality of cuts or slits 56 that split the underlay body 50 into a plurality of fingers or arm sections 58. In the cylindrical configuration of the underlay 5, as shown in FIG. 3, the slits 56 extend mutually parallel and/or parallel to the drum axis S, the axial direction A and/or the arm direction D. Consequently, the arm sections 58 extend mutually parallel as well. In particular, each arm section 58 extends parallel to the arm direction D of the respective pressing arm 3.

The underlay 5 is mounted on the drum body 10 in such a way that each arm section 58 is extends along and rest on a respective pressing arm 3 of the plurality of pressing arms 3. Because of the slits 56, the arm sections 58 can be variably spaced apart in the circumferential direction C at the second end 52 in response to a change in orientation of the pressing arms 3. In particular, the arm sections 58 are spread apart to follow the spreading apart of the pressing arms 3 as they move or expand towards a greater diameter, corresponding to the conical configuration of FIG. 2.

Each arm section 58 may have the same width or extent along the same arc length as the respective pressing arm 3 in the circumferential direction C, or it may be wider than the respective pressing arm 3 such that it also extends into the circumferential gap between subsequent pressing arms 3. As such, the arm sections 58 may also prevent that the turn-up bladder 2 is pinched or gets stuck between the pressing arms 3 when said pressing arms 3 are contracted inwards.

Note that the plurality of slits 56 extends over at least half of a length L of the underlay body 50 between the first end 51 and the second end 52. In this example, the slits 56 extend over at least seventy percent of said length L, and preferably at least ninety percent. Optionally, the slits 56 are terminated with appropriately formed slit ends 57, i.e. rounded slit ends 57 with a certain minimum radius, to prevent that the slits 56 tear into the underlay 5 beyond the respective slit ends 57 towards the first end 51.

The underlay 5 is further provided with mounting elements 59, in particular mounting holes, for receiving the aforementioned fasteners 7 for mounting of said underlay body 50 to the drum body 10. Alternatively, the underlay 5 may be held relative to the drum body 10 with the use of pins that fit in corresponding holes. For example, the fasteners 7 may be pins that fit in the mounting holes 59. In this situation, the turn-up bladder 2, when mounted over the underlay 5, may prevent that the pins leave the mounting holes in use. Conversely, the pins may be connected to or integrated with the underlay 5 and the mounting holes may be provided in the drum body 10. Again, the turn-up bladder 2, when mounted over the underlay 5, may prevent that the pins leave the mounting holes in use.

Figure 5:
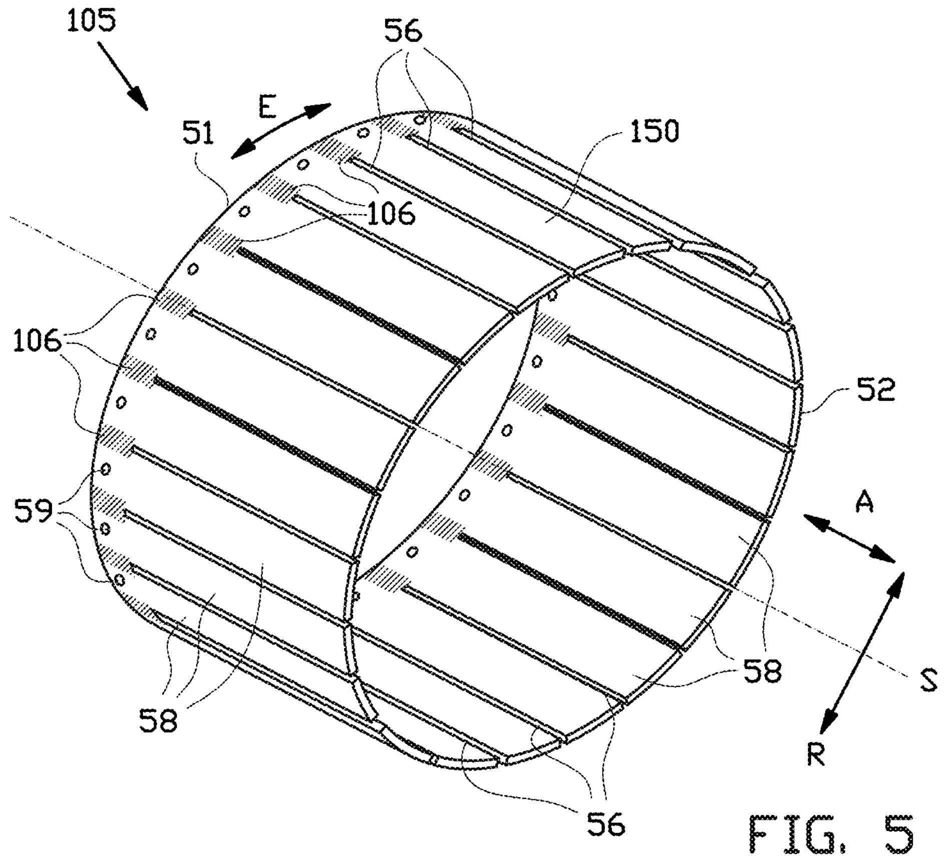
FIG. 5 shows an isometric view of an alternative underlay having a plurality of bridge portions according to a second embodiment of the invention.
Figure 6:
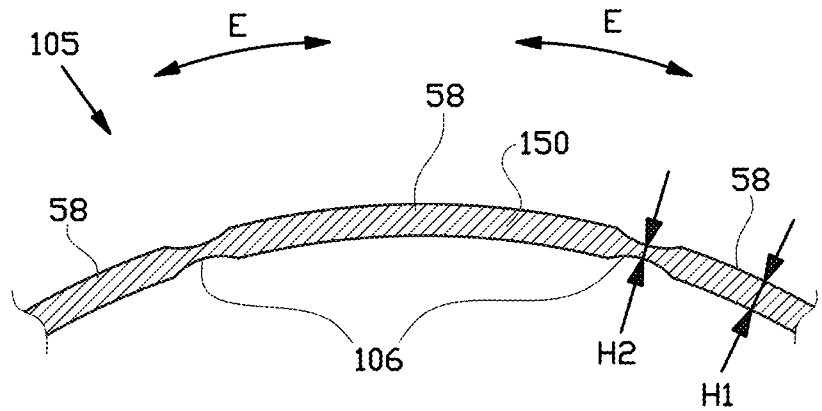
FIG. 6 shows a cross section of the alternative underlay according in FIG. 5 at one of the bridge portions.

FIGS. 5 and 6 show an alternative underlay 105 according to a second embodiment of the invention, for use with the tire building drum 1 according to FIGS. 1 and 2. The alternative underlay 105 differs from the aforementioned underlay 5 in that the underlay body 150 comprises a plurality of bridge portions 106.

Each bridge portion 106 interconnects a pair of arm sections 58 at the first end 51. In this example, the bridge portions 106 are the only parts of the underlay body 150 interconnecting the arm sections 58. In other words, the arm sections 58 are interconnected at the first end 51 solely by the bridge portions 106.

Each bridge portion 106 has an elasticity E in the circumferential direction C that is greater than an elasticity in the circumferential direction C of the respective pair of arm sections 58 it interconnects. As best seen in FIG. 6, the underlay body 150, at the plurality of arm sections 58, has a first thickness H1 and, at the plurality of bridge portions 106, 206, has a second thickness H2 smaller than the first thickness H1. The smaller second thickness H2 can effectively increase the elasticity E of the bridge portions 106 with respect to the rest of the underlay body 150.

The alternative underlay 105 has the technical advantage over the previously discussed underlay 5 that the bridge portions 106 allow for a diameter expansion of the underlay body 150, at least at the first end 51, for mounting of the underlay body 150 to the drum body 10, without the need of joining or splicing the alternative underlay 105 at the drum body 10. Hence, the alternative underlay 105 can be manufacturing and/or formed with a continuous or annular first end 51 prior to fitting or mounting of said alternative underlay 105 to the drum body 10. Moreover, the alternative underlay 105 can be removed from the drum body 10 without damaging the underlay body 150.

Figure 7:
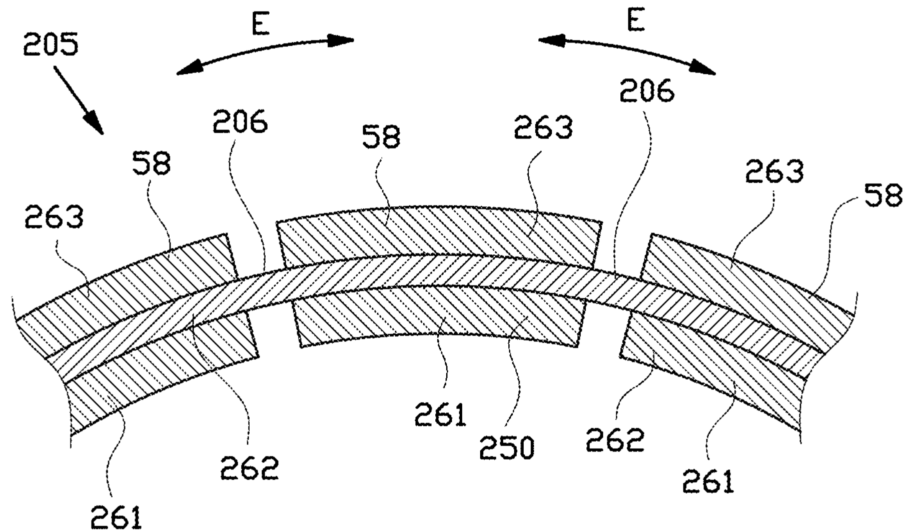
FIG. 7 shows a cross section of a further alternative underlay at one of the bridge portions.

FIG. 7 shows a further alternative underlay 205 according to a third embodiment of the invention, for use with the tire building drum 1 according to FIGS. 1 and 2. The further alternative underlay 205 differs from the alternative underlay 105 in FIGS. 5 and 6 in that the underlay body 250 is provided with bridge portions 206 which comprise a different configuration of layers compared to the plurality of arm sections 58. In this example, the further alternative underlay 205 comprises a laminate of a first layer 261, a second layer 262 and a third layer 263. In the arm sections 58, the second layer 262 is sandwiched between, covered by or attached to at least one of the other layers 261, 263, whereas the second layer 262 is the only layer extending in the bridge portions 206. Hence, the second layer 262 is exposed in or at said bridge portions 206. The second layer 262 has an elasticity E that is greater than the elasticity of the other layers 261, 263. In particular, the other layers 261, 263 may be inelastic or substantially inelastic in the circumferential direction D, at least within the normal range of forces that are exerted onto the underlay body 250 during turning-up.

If the second layer 262 has sufficient elasticity E in the circumferential direction C, it may also extend in the area between the arm sections 58 towards or even up to the second end 52, for example as an alternative to having the slits 56, provided that the second layer 262 does not hinder the operational range of the pressing arms 3.

It is further envisioned that, as an alternative to the laminated layers 261, 262, 263, the bridge portions 206 may comprise a different material with a different elasticity E to the material of the arm sections 58.

Figure 8:
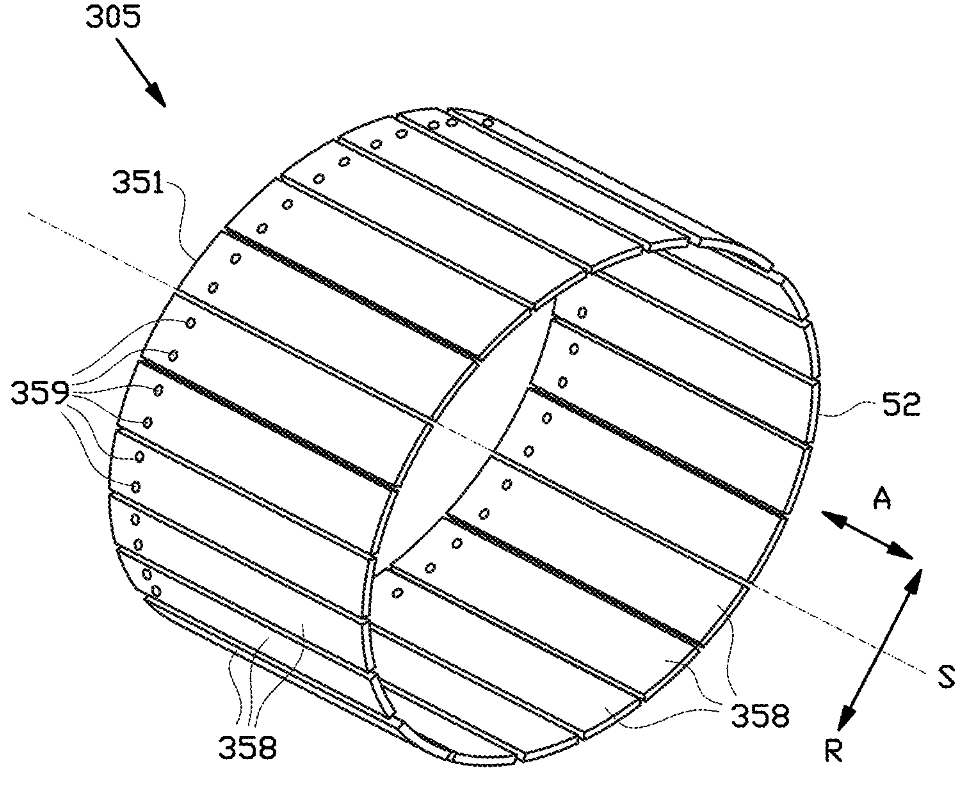
FIG. 8 shows an isometric view of a further alternative underlay according to a third embodiment of the invention.

FIG. 8 shows a further alternative underlay 305 according to a fourth embodiment of the invention, for use with the tire building drum 1 according to FIGS. 1 and 2. The further alternative underlay 305 differs from the aforementioned underlays 5, 105, 205 in that it comprises a plurality of arm sections 358 extending separately from the first end 351 towards a second end 52 opposite to the first end 351. In other words, the arm sections 358 are not interconnected at the first end 51, or at any point along their length. Each arm section 358 is individually fixed, attached or mounted to the drum body 10. Furthermore, each arm section 358 extends along and rests on a respective pressing arm 3. To make sure that each arm section 358 remains properly aligned with the pressing arm 3 onto which it rests, multiple mounting elements 359 may be provided for each arm section 358, for example two spaced apart mounting holes.

Figure 9:
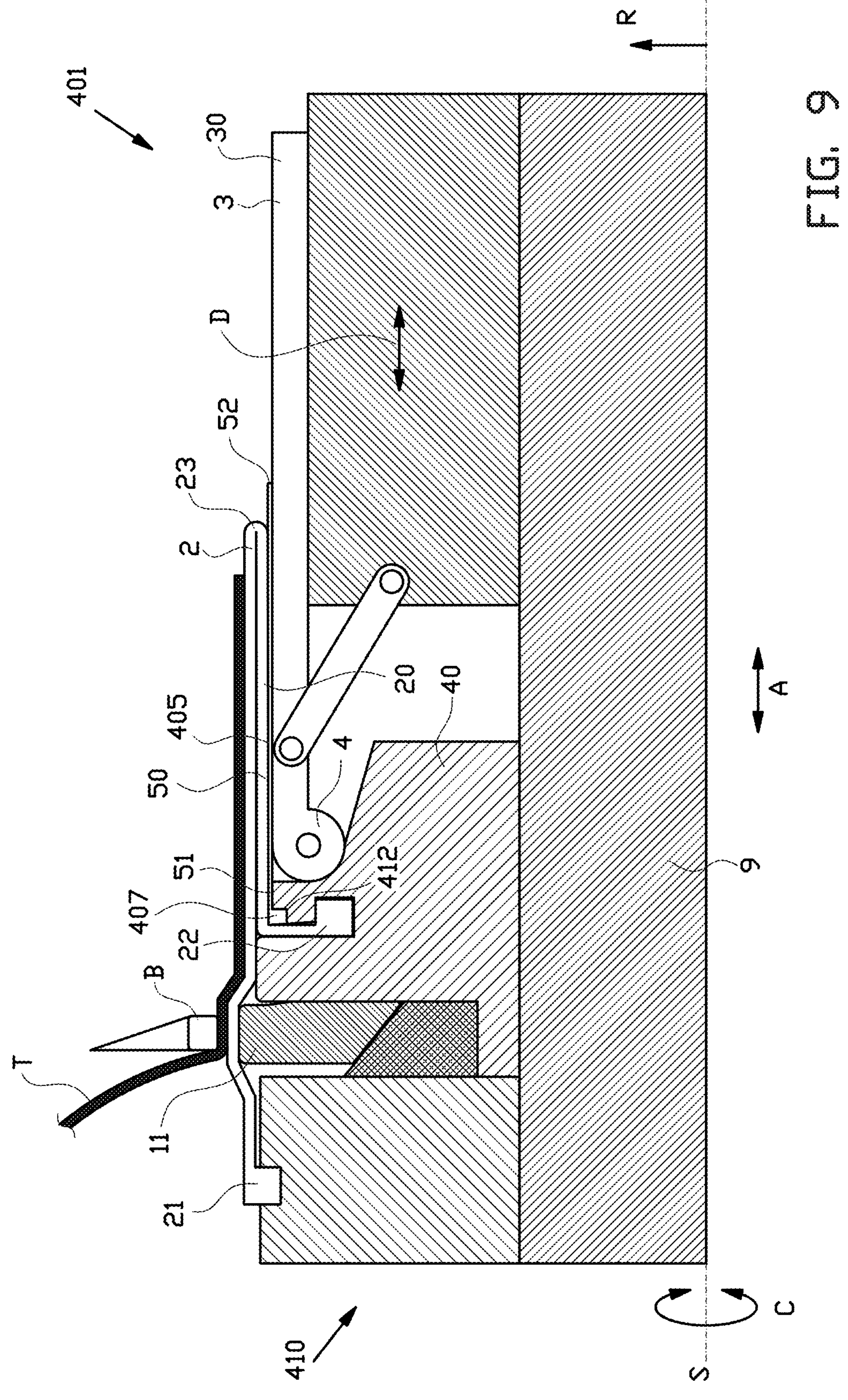
FIG. 9 shows a cross section of an alternative tire building having a further alternative underlay according to a fourth embodiment of the invention.

FIG. 9 shows an alternative tire building drum 401 that differs from the aforementioned tire building drum 1 in that it comprises a further alternative underlay 405 that differs from the previously discussed underlays 5, 105, 205, 305 in that it is fixed or fastened to the drum body 410 at or near its first end 51 using a fastener 407 in the form of a ridge or a ledge extending in the circumferential direction C about the drum axis S. The ridge or ledge may be continuous or discontinuous in the circumferential direction C. The drum body 410 is provided with a corresponding or complementary shaped hole or groove 412 for receiving the fastener 407 in a form-fitting manner. The further alternative underlay 405 is effectively sandwiched or boxed in between the bladder 2 and the drum body 2.

A method for turning-up a tire component T using the aforementioned tire building drum 1 and a use of any one of the aforementioned underlays 5, 105, 205, 305 in said tire building drum 1 will now be briefly elucidated with reference to FIGS. 1 and 2. It will be understood that any reference to the underlay 5 according to the first embodiment of the invention also applies, mutatis mutandis, to the other underlays 105, 205, 305.

As shown in FIG. 1, the underlay 5 is provided between the hinges 4 and the turn-up bladder 2 in the cylindrical configuration, resting on the pressing arms 3 which are in the arms-down position. The turn-up bladder 2 is uninflated and is directly supported by the underlay 5 at the hinges 4. The tire component T is applied around the tire building drum 1 and has a part inside of the bead B at the bead-lock section 11 and a part outside of the bead B at the bead-lock section 11. In this example, the part of the tire component T inside of the bead B is at least partially shaped into a toroidal shape. The part of the tire component T outside of the bead B is resting on the turn-up bladder 2.

FIG. 2 shows the situation in which the turn-up bladder 2 has been inflated to turn-up the part of the tire component T outside of the bead B around said bead B up to and against the part of the tire component T inside the bead B. The pressing arms 3 have been turned-up from the arms-down position into the arms-up position. The underlay 5 has assumed an at least partially conical configuration in response to the turning-up of the pressing arms 3. The arm sections 58 remain in place on the respective pressing arms 3. During the turning-up of the pressing arms 3, each arm section 58 may shift or slide slightly in the arm direction D of the respective pressing arm 3 onto which it is resting. The underlay 5 however remains aligned with the respective pressing arm 3 and, more in particular, remains in a position between the hinges 4 and the turn-up bladder 2 to effectively shield the turn-up bladder 2 from any acute angles or sharp edges formed at said hinges 4 as a result of the turning-up of the pressing arms 3.

After the turning-up, the pressing arms 3 may be returned or contracted to their arms-down position of FIG. 1 and the turn-up bladder 2 may be deflated again, after which the tire building drum 1 is ready for another cycle of the method. During said inward movement of the pressing arms 3, the underlay 5 can effectively prevent that the turn-up bladder 2 is pulled into or gets pinched by the hinges 4.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

LIST OF REFERENCE NUMERALS

1 tire building drum
10 drum body
11 bead-lock section
2 turn-up bladder
20 bladder body
21 first circumferential edge

22 second circumferential edge
23 fold
3 pressing arm
30 arm body
4 hinge
40 arm support
5 underlay
50 underlay body
51 first end
52 second end
53 first splice edge
54 second splice edge
55 splice lip
56 slit
57 slit end
58 arm section
59 mounting element
7 fastener
9 drum shaft
105 alternative underlay
150 underlay body
106 bridge portion
205 further alternative underlay
250 underlay body
206 bridge portion
261 first layer
262 second layer
263 third layer
305 further alternative underlay
351 first end
358 arm section
359 mounting element
401 alternative tire building drum
405 further alternative underlay
407 fastener
410 drum body
412 groove
A axial direction
B bead
C circumferential direction
D arm direction
E elasticity
H1 first thickness
H2 second thickness
L length
R radial direction
S drum axis
T tire component

The invention claimed is:

1. A tire building drum comprising:

a drum body that is rotatable about a drum axis;

an inflatable turn-up bladder extending in a circumferential direction about the drum axis around the drum body for turning-up a tire component supported on said turn-up bladder;

a plurality of pressing arms distributed in the circumferential direction around the drum body and located between the drum body and the turn-up bladder for pressing against the turn-up bladder during the turning-up of the tire component; and a plurality of hinges for hingably connecting the pressing arms to the drum body, wherein the plurality of hinges is located underneath the turn-up bladder when the turn-up bladder is uninflated, wherein the tire building drum is provided with an underlay sliding over the pressing arms and extending between at least one hinge of the plurality of hinges and the turn-up bladder in a radial direction perpendicular to the drum axis, and wherein the underlay comprises an underlay body that is annular at a first end and split into a plurality of arm sections at a second end opposite to the first end.

2. The tire building drum according to claim 1, wherein the underlay has the first end that is fixed to the drum body at a side of the plurality of hinges facing away from the plurality of pressing arms.

3. The tire building drum according to claim 2, wherein the underlay has a second end opposite to the first end, wherein the second end rests on at least one pressing arm of the plurality of pressing arms.

4. The tire building drum according to claim 3, wherein the second end is free, unfixed or unrestrained to slide over said at least one pressing arm in an arm direction parallel to said at least one pressing arm.

5. The tire building drum according to claim 3, wherein the underlay is at least partially transformable from a cylindrical configuration into a conical configuration.

6. The tire building drum according to claim 2, wherein the underlay comprises a plurality of arm sections extending separately from the first end towards the second end opposite to the first end.

7. The tire building drum according to claim 6, wherein each arm section of the plurality of arm sections is configured to extend along and rest on a respective pressing arm of the plurality of pressing arms.

8. The tire building drum according to claim 1, wherein the drum body comprises a bead-lock section, wherein the underlay has the first end that is fixed to the drum body at a side of the plurality of hinges facing the bead-lock section.

9. The tire building drum according to claim 1, wherein each arm section of the plurality of arm sections is configured to extend along and rest on a respective pressing arm of the plurality of pressing arms.

10. The tire building drum according to claim 1, wherein the underlay body, at the plurality of arm sections, is transformable from a cylindrical configuration into a conical configuration.

11. The tire building drum according to claim 10, wherein the underlay body is provided with a plurality of slits splitting the underlay body into the plurality of arm sections.

12. The tire building drum according to claim 11, wherein the plurality of slits, in the cylindrical configuration of the underlay body, extends mutually parallel.

13. The tire building drum according to claim 11, wherein the plurality of slits extends over at least half of a length of the underlay body between the first end and the second end.

14. The tire building drum according to claim 1, wherein the underlay body comprises a plurality of bridge portions, wherein each bridge portion of the plurality of bridge portions interconnects a pair of arm sections of the plurality of arm sections at the first end, wherein each bridge portion has an elasticity in the circumferential direction that is greater than an elasticity in the circumferential direction of the respective pair of arm sections it interconnects.

15. The tire building drum according to claim 14, wherein the underlay body, at the plurality of arm sections, has a first thickness and, at the plurality of bridge portions, has a second thickness smaller than the first thickness.

16. The tire building drum according to claim 14, wherein the underlay body comprises a different material at the plurality of bridge portions compared to the plurality of arm sections.

17. The tire building drum according to claim 14, wherein the underlay body comprises a different configuration of layers at the plurality of bridge portions compared to the plurality of arm sections.

18. The tire building drum according to claim 14, wherein the underlay body comprises a laminate of a first layer with a first elasticity and a second layer with a second elasticity greater than the first elasticity, wherein the second layer is covered by the first layer at the plurality of arm sections and exposed at the plurality of bridge portions.

19. The tire building drum according to claim 1, wherein the underlay body is spliced into an annular configuration at the first end.

20. The tire building drum according to claim 1, wherein the underlay has the first end that is fixed to the drum body by one or more fasteners.

21. The tire building drum according to claim 20, wherein the one or more fasteners comprises a fastener of the group comprising: a pin, a bolt, a clamp or a ridge.

22. A method for turning-up a tire component using a tire building drum according to claim 1, wherein the method comprises the steps of:

providing the underlay between the at least one hinge and the turn-up bladder in the radial direction; and supporting the turn-up bladder on the underlay at the at least one hinge during the turning-up of the tire component.

* * * * *